(12) United States Patent  
Ihara

(10) Patent No.: US 8,761,473 B2
(45) Date of Patent: Jun. 24, 2014

(54) TREE STRUCTURE CREATION APPARATUS, METHOD AND PROGRAM

(75) Inventor: Satoshi Ihara, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 215 days.

(21) Appl. No.: 13/450,325

(22) Filed: Apr. 18, 2012

(65) Prior Publication Data

US 2012/0269410 A1 Oct. 25, 2012

(30) Foreign Application Priority Data

Apr. 19, 2011 (JP) ................................. 2011-092940

(51) Int. Cl.
*G06K 9/00* (2006.01)
(52) U.S. Cl.
USPC .......................................... 382/128; 382/240
(58) Field of Classification Search
USPC ............ 382/128, 240, 249; 585/331; 604/284
See application file for complete search history.

(56) References Cited

U.S. PATENT DOCUMENTS

| | | |
|---|---|---|
| 6,430,430 B1 | 8/2002 | Gosche |
| 6,449,502 B1 | 9/2002 | Ohkubo |
| 7,542,959 B2 | 6/2009 | Barnhill et al. |
| 8,345,940 B2 | 1/2013 | Mattiuzzi et al. |
| 8,422,752 B2 | 4/2013 | Sakuragi |
| 8,526,690 B2 | 9/2013 | Kitamura |
| 8,630,467 B2 | 1/2014 | Masumoto |
| 8,634,628 B2 | 1/2014 | Inoue |
| 2008/0044080 A1 | 2/2008 | Li |
| 2008/0312527 A1 | 12/2008 | Masumoto et al. |
| 2009/0076394 A1 | 3/2009 | Wong et al. |
| 2010/0211588 A1* | 8/2010 | Jiang et al. .................... 707/768 |
| 2010/0246912 A1* | 9/2010 | Periaswamy et al. ......... 382/131 |
| 2011/0075900 A1 | 3/2011 | Masumoto |
| 2011/0135172 A1 | 6/2011 | Kitamura |
| 2011/0268338 A1 | 11/2011 | Collins et al. |

(Continued)

FOREIGN PATENT DOCUMENTS

JP 2010-220742 A 10/2010

OTHER PUBLICATIONS

Chia-Ling Tsai, Yi-Lun Yang, Shih-Jen Chen, Chih-Hao Chan, Wei-Yang Lin, Automatic characterization and segmentation of classic choroidal neovascularization using Adaboost for supervised learning, Nuclear Science Symposium Conference Record (NSS/MIC), 2010 IEEE, Oct. 30, 2010, 3610-3612.*
Pechin Lo, van Ginneken, B., de Bruijne, M., Vessel tree extraction using locally optimal paths, Biomedical Imaging: From Nano to Macro, 2010 IEEE, Apr. 14, 2010, 680-683.
United States Office Action dated Jan. 29, 2014, in U.S. Appl. No. 13/454,765.

*Primary Examiner* — Gregory F Cunningham
(74) *Attorney, Agent, or Firm* — McGinn IP Law Group, PLLC

(57) ABSTRACT

A predetermined structure repeatedly branching from an origin and extending in directions away from the origin in such a manner to become wider is extracted, as a candidate of a tree structure defined by a plurality of nodes including a root node corresponding to the origin and a plurality of edges, from medical image data. A tree structure is created by reevaluating the definition of the tree structure, with respect to each of the plurality of nodes defining the candidate of the tree structure, by using a cost function that weights a probability that the plurality of nodes are connected to each other by evaluating a relationship between each of the plurality of nodes and the root node based on a geometric characteristic that the predetermined structure repeatedly branches from the origin and extends in directions away from the origin in such a manner to become wider.

8 Claims, 3 Drawing Sheets

(56) References Cited

U.S. PATENT DOCUMENTS

| | | |
|---|---|---|
| 2012/0269410 A1 | 10/2012 | Ihara |
| 2012/0275682 A1 | 11/2012 | Ihara |
| 2013/0108131 A1 | 5/2013 | Abramoff et al. |
| 2013/0108133 A1 | 5/2013 | Inoue |
| 2013/0301889 A1 | 11/2013 | Abramoff et al. |

* cited by examiner

TREE STRUCTURE CREATION APPARATUS, METHOD AND PROGRAM

BACKGROUND OF THE INVENTION

1. Field of the Invention

The present invention relates to a tree structure creation apparatus, method and program for creating a tree structure of a specific structure detected in image data.

2. Description of the Related Art

When a surgery is performed on an organ, such as a liver and a lung, to remove a diseased part therefrom, if the organ is a liver for example, blood vessels, a hepatic parenchyma, and a tumor region need to be extracted from an X-ray CT image of the liver. Further, a blood vessel dominating the extracted tumor region needs to be identified based on the positions of core lines, diameters and the like of the extracted blood vessels. In this manner, the blood vessel that supplies nutrition to the tumor should be identified, and a region dominated by the blood vessel should be appropriately determined, as a region to be removed. Such processes are necessary to appropriately remove a part of a portal vein supplying nutrition to the tumor and a region dominated by the part of the portal vein, and into which a substance to be noted, such as cancer cells, may have spread, in such a manner that the function of the liver is maintained even after removal. Therefore, it is important to precisely simulate a region to be removed before the surgery. Further, it is necessary to accurately extract the center lines of blood vessels running in a lung or a liver for the simulation operation.

Here, a method using a Hessian matrix has been proposed, as an image recognition technique for extracting a linear structure, such as bronchi, as a tree structure from a three-dimensional medical image obtained by CT or the like. Specifically, first, multiple resolution transformation is performed on the three-dimensional medical image. Then, an eigenvalue analysis of Hessian matrix is performed on an image of each resolution, and linear structure elements are extracted. The linear structure element has a characteristic that only one of three eigenvalues obtained by eigenvalue analyses is close to 0. Then, analysis results about images of respective resolutions are unified to extract linear structure elements (blood vessels) in various sizes from the three-dimensional medical image. Further, the extracted linear structure elements are connected to each other by using minimum spanning tree algorithm or the like. Consequently, data of a tree structure representing a tubular structure in the three-dimensional medical image are obtained. When the linear structure elements are connected to each other by using minimum spanning tree algorithm, a cost function based on a positional relationship between the linear structure elements and the principal axis direction of each of the linear structure elements represented by an eigenvector corresponding to an eigenvalue close to 0 is used (U.S. Patent Application Publication No. 20110135172 (Patent Document 1)).

However, when the number of times of branching is large and branches of blood vessels run close to each other as if they are entangled with each other, as in a portal vein and hepatic veins in a liver, if blood vessels such as the portal vein are extracted by using a technique similar to Patent Document 1, a branch of a hepatic vein, which is not the portal vein, is erroneously extracted as a branch of the portal vein in some cases.

SUMMARY OF THE INVENTION

In view of the foregoing circumstances, it is an object of the present invention to provide a tree structure creation apparatus, method and program that can extract blood vessels repeatedly branching from an origin and extending in directions away from the origin in such a manner to become wider more efficiently and more accurately than conventional techniques. For that purpose, the present invention utilizes a characteristic that branches of a portal vein and branches of blood vessels in a lung differ from other blood vessels in that the branches of the portal vein and the branches of the blood vessels in the lung repeatedly branch from an origin and extend in directions away from the origin in such a manner to become wider.

A tree structure creation apparatus of the present invention is a tree structure creation apparatus comprising:

a tree structure candidate extraction means that extracts, from medical image data, a predetermined structure repeatedly branching from an origin and extending in directions away from the origin in such a manner to become wider, as a candidate of a tree structure defined by a plurality of nodes including a root node corresponding to the origin and a plurality of edges; and a tree structure creation means that creates a tree structure by reevaluating the definition of the tree structure, with respect to each of the plurality of nodes defining the extracted candidate of the tree structure, by using a cost function that weights a probability that the plurality of nodes are connected to each other by evaluating a relationship between each of the plurality of nodes and the root node based on a geometric characteristic that the predetermined structure repeatedly branches from the origin and extends in directions away from the origin in such a manner to become wider.

A tree structure creation method according to the present invention is a tree structure creation method comprising the steps of:

extracting, from medical image data, a predetermined structure repeatedly branching from an origin and extending in directions away from the origin in such a manner to become wider, as a candidate of a tree structure defined by a plurality of nodes including a root node corresponding to the origin and a plurality of edges; and creating a tree structure by reevaluating the definition of the tree structure, with respect to each of the plurality of nodes defining the extracted candidate of the tree structure, by using a cost function that weights a probability that the plurality of nodes are connected to each other by evaluating a relationship between each of the plurality of nodes and the root node based on a geometric characteristic that the predetermined structure repeatedly branches from the origin and extends in directions away from the origin in such a manner to become wider.

A tree structure creation program of the present invention is a tree structure creation program causing a computer to function as:

a tree structure candidate extraction means that extracts, from medical image data, a predetermined structure repeatedly branching from an origin and extending in directions away from the origin in such a manner to become wider, as a candidate of a tree structure defined by a plurality of nodes including a root node corresponding to the origin and a plurality of edges; and a tree structure creation means that creates a tree structure by reevaluating the definition of the tree structure, with respect to each of the plurality of nodes defining the extracted candidate of the tree structure, by using a cost function that weights a probability that the plurality of nodes are connected to each other by evaluating a relationship between each of the plurality of nodes and the root node based on a geometric characteristic that the predetermined structure repeatedly branches from the origin and extends in directions away from the origin in such a manner to become wider.

Here, the predetermined structure may be any structure as long as the structure is an object from which a shape model, as a tree structure with a root composed of nodes and edges connecting the nodes, is creatable, and the structure repeatedly branches from an origin and extends in directions away from the origin in such a manner to become wider. For example, plural predetermined structures may be blood vessels in a lung or a liver. Specifically, the plural predetermined structures may be pulmonary arteries and pulmonary veins in the lung, or a portal vein, hepatic arteries, and hepatic veins in the liver, or the like.

The medical image data may be obtained by imaging, for example, by a CT, MR, ultrasonic, PET-CT, SPECT, 4D-CT, OCT, or X-ray radiography (CR, DR) apparatus. For example, the medical image data may be three-dimensional image data, such as volume data.

As the method for extracting a predetermined structure as a candidate of a tree structure, any known method may be used as long as the predetermined structure is extractable as a tree structure. For example, the tree structure creation apparatus of the present invention may detect a region having the image characteristic of the predetermined structure in image data, and extract the predetermined structure by dividing, based on branching points, a predetermined distance or the like, thin lines obtained by thinning in the detected region.

Any tree structure creation method may be adopted to "create a tree structure" as long as nodes are connectable to each other in such a manner that the strength of connection between the nodes becomes higher by calculating, as a cost, an index value representing the strength of connection between the nodes for each of the nodes. For example, a spanning tree algorithm, such as a minimum spanning tree algorithm and a shortest path algorithm, may be adopted.

Any cost function may be used in the tree structure creation apparatus of the present invention as long as the cost function weights a probability that nodes are connected to each other by evaluating a relationship between each of the nodes and the root node based on a geometric characteristic that a predetermined structure repeatedly branches from an origin and extends in directions away from the origin in such a manner to become wider. For example, it is desirable that the cost function weights, based on an angle between a segment connecting the root node and each of the plurality of nodes and an edge between the node connected to the root node and a node next to the node in the directions away from the root node, in such a manner that a probability that each of the plurality of nodes and the node next to each of the plurality of nodes are connected to each other is higher as the angle is smaller. Alternatively, it is desirable that the cost function weights, based on a difference between the length of a segment connecting the root node and each of the nodes and the length of an edge between the node connected to the root node and a node next to the node in the directions away from the root node, in such a manner that a probability that each of the nodes and the node next to each of the nodes are connected to each other is higher as the difference is smaller.

An origin may be identified by using an arbitrary method. Further, a root node corresponding to the origin may be identified based on the origin by using a known method. For example, the origin may be selected in a displayed image by using an input device, such as a mouse. Further, an origin detection means that detects the origin by performing machine learning on plural sets of training data, each representing a tree structure in which an origin is known, may be provided, and the origin may be detected by the origin detection means. Various kinds of known method in which a root node is extracted by performing machine learning on training data may be used. For example, the origin may be detected based on the feature value of the origin that is known in training data by an Adaboost algorithm.

According to the tree structure creation apparatus, method and program of the present invention, a predetermined structure repeatedly branching from an origin and extending in directions away from the origin in such a manner to become wider is extracted, as a tree structure defined by plural nodes including a root node corresponding to the origin and plural edges, from medical data. Further, with respect to each of the nodes defining the tree structure, weighting is performed on a probability that the nodes are connected to each other by evaluating a relationship between each of the nodes and the root node based on a geometric characteristic that the predetermined structure repeatedly branches from the origin and extends in directions away from the origin in such a manner to become wider. Therefore, it is possible to more efficiently and accurately create a tree structure by reevaluating the definition of the tree structure by utilizing a geometric characteristic that the predetermined structure repeatedly branches from an origin and extends in directions away from the origin in such a manner to become wider.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and Internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

DESCRIPTION OF THE PREFERRED EMBODIMENTS

Figure 1:
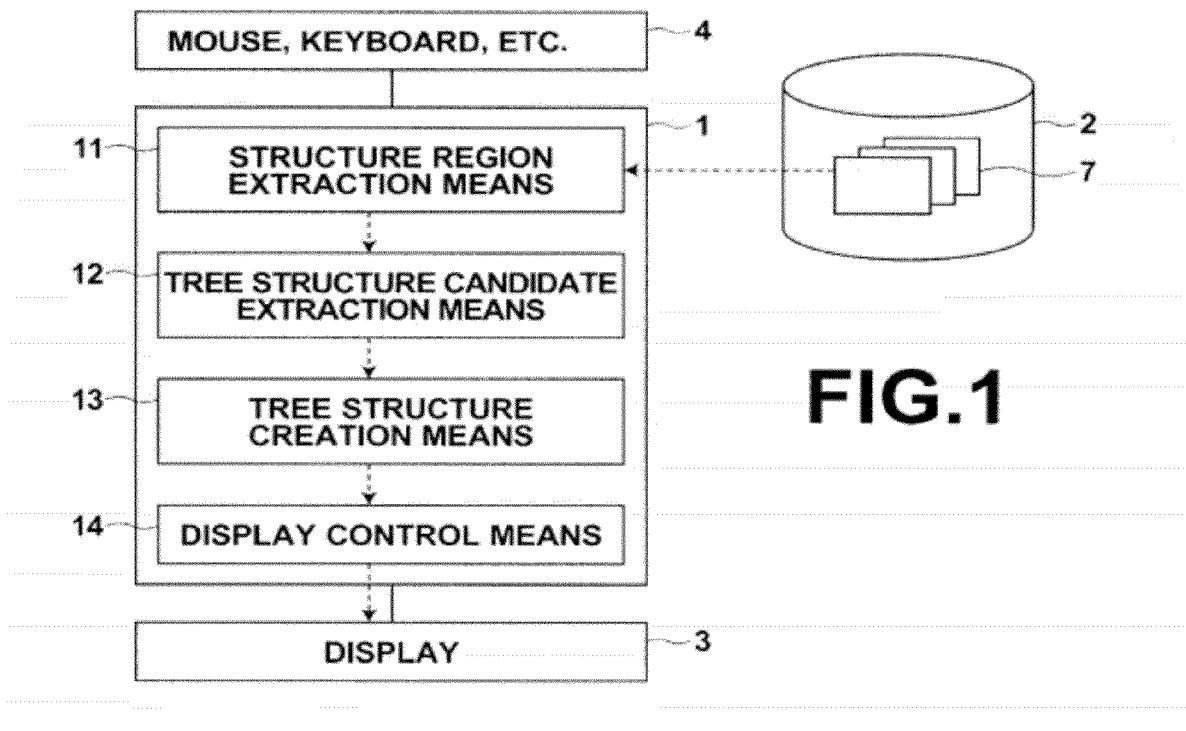
FIG. 1 is a functional block diagram illustrating a tree structure creation apparatus according to an embodiment of the present invention.

Hereinafter, embodiments of a tree structure creation apparatus according to the present invention will be described in detail with reference to drawings. FIG. 1 is a schematic diagram illustrating the configuration of a tree structure creation apparatus 1 according to a first embodiment of the present invention. The configuration of the tree structure creation apparatus 1, as illustrated in FIG. 1, is realized by causing a computer to execute a tree structure creation program that has been read in an auxiliary storage apparatus. At this time, the tree structure creation program is stored in a recording medium, such as a CD-ROM, or distributed through a network, such as the Internet, and installed in the computer. The tree structure creation apparatus 1, illustrated in FIG. 1, creates a tree structure representing a portal vein from image data representing a structure, such as a portal vein in a liver. The tree structure creation apparatus 1 includes a structure region detection means 11, a tree structure candidate extraction means 12, a tree structure creation means 13 and a display control means 14. Further, the computer in which a tree structure creation program according to an embodiment of the present invention has been installed includes a main body that functions as the tree structure creation apparatus 1, a display device 3 including a display, an input device 4, such as a mouse and a keyboard, and a storage means 2 including a memory, a hard disk, or the like.

Figure 2:
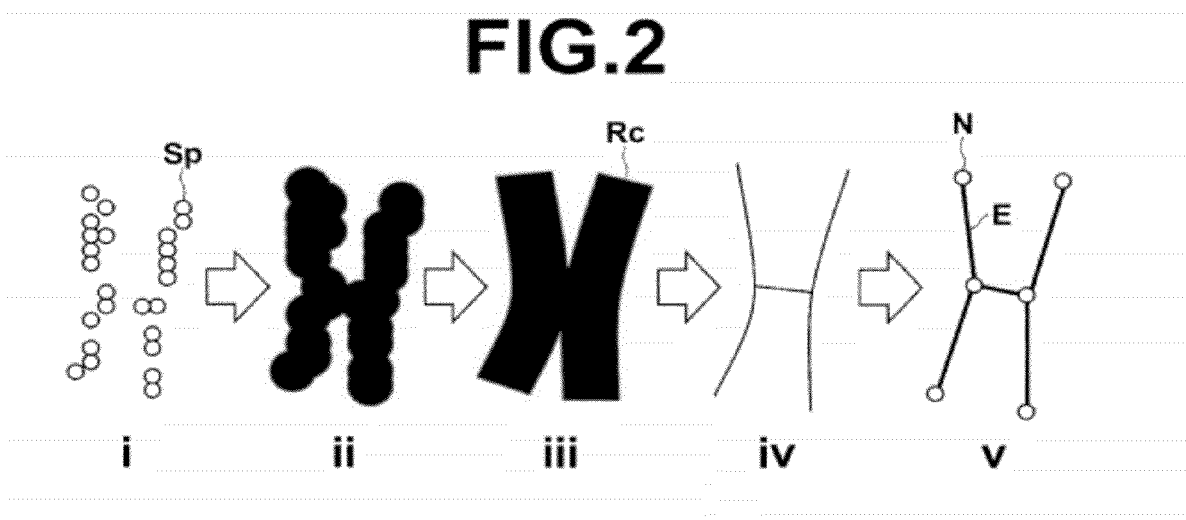
FIG. 2 is a diagram for explaining tree structure candidate extraction processing on a blood vessel region in a liver detected as a structure.

The structure region detection means 11 detects candidate region Rc by judging whether a region constitutes a part of a predetermined structure in image data. Image data 7 include a two-dimensional image that has been obtained, for example, by imaging at a radiography apparatus or a radiation detection apparatus, and stored in the storage means 2, or three-dimensional volume data generated from plural two-dimensional images. FIG. 2 is a schematic diagram illustrating a manner of extracting a candidate of a tree structure. In FIG. 2, a blood vessel that is a predetermined structure region is extracted, as candidate region Rc of the blood vessel, and a graph based on the extracted candidate region Rc of the blood vessel is generated to extract the candidate of the tree structure.

Here, a case in which a predetermined structure is a portal vein in a liver, and candidate region Rc of the portal vein is detected in volume data will be described, as an example.

First, as illustrated in FIG. 2 (Step i), the structure region detection means 11 calculates the positions of plural candidate points Sp (p=1 to n: n is the number of extracted candidate points) constituting a core line of the portal vein based on the values of voxel data constituting volume data 7. Here, the values of voxel data that have been known to voxels (pixels) representing a portal vein are obtained by statistics or the like before calculating the aforementioned positions, and voxels (pixels) that are likely to be the portal vein are judged as candidate points Sp based on the obtained values of voxel data.

Further, as illustrated in FIG. 2 (Step ii), the structure region detection means 11 expands the candidate points Sp. Further, as illustrated in FIG. 2 (Step iii), the structure region detection means 11 judges, as a portal vein region, image data having voxel values (pixel values) within a predetermined range including voxel values (pixel values) of the expanded candidate points Sp that represent the portal vein, and extracts the portal vein region as candidate region Rc.

The method for extracting the candidate region Rc is not limited to the method used in the present embodiment, and the structure region detection means 11 may adopt various kinds of known method that can extract candidate region Rc. For example, the structure region detection means 11 may calculate feature values representing the likelihood of a portal vein with respect to voxel data in the vicinity of the candidate points, and identify, based on the calculated feature values, whether the voxel data represent a portal vein region. In such a case, the identifying operation based on the feature values may be performed based on an evaluation function that has been obtained in advance by machine learning. Alternatively, the structure region detection means 11 may detect the candidate region by using a technique disclosed in Patent Document 1, or other known techniques.

Next, the tree structure candidate extraction means 12 extracts a predetermined structure (portal vein) repeatedly branching from an origin and extending in directions away from the origin in such a manner to become wider, as a candidate of a tree structure defined by plural nodes including a root node corresponding to the origin and plural edges. In the present embodiment, first, the tree structure candidate extraction means 12 obtains candidate region Rc illustrated in FIG. 2 (Step iii), and which has been detected by the structure region detection means 11. Further, as illustrated in FIG. 2 (Step iv), the tree structure candidate extraction means 12 performs thinning on the obtained candidate region Rc by using a known method. Further, as illustrated in FIG. 2 (Step v), the tree structure candidate extraction means 12 divides the thinned lines at branching points. Further, the tree structure candidate extraction means 12 defines the branching points and end points, as plural nodes $N_i$ (i=1 to m: m is the number of extracted candidate points), and extracts a candidate of a tree structure by defining divided segments, as plural edges E. The thinned lines may be divided not only at the branching points, but also based on a predetermined condition, such as a predetermined interval. Such a predetermined condition is used to appropriately divide a gradually curved part of the thinned lines into plural segments along the curve.

Figure 3:
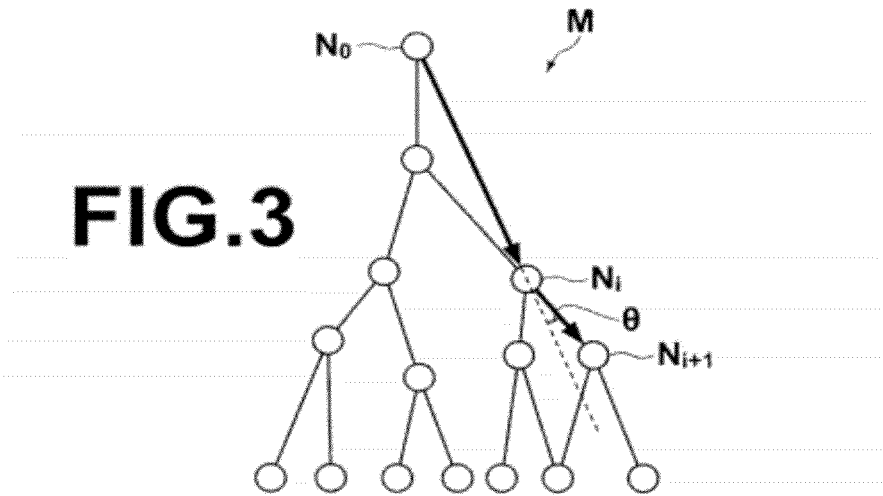
FIG. 3 is a diagram for explaining a method for calculating a cost between nodes in an embodiment of the present invention.

The tree structure creation means 13 creates tree structure M by reevaluating the definition of the tree structure, with respect to each of nodes $N_i$ (i=1 to m: m is the number of extracted candidate points) defining the extracted candidate of the tree structure by weighting a probability that the nodes are connected to each other. With reference to FIG. 3, the principle of determining a cost between nodes N by the tree structure creation means 13 will be described. FIG. 3 is a diagram illustrating a candidate of a tree structure representing a portal vein extracted by the aforementioned tree structure candidate extraction processing.

Here, the inventor of the present invention has noted that a predetermined structure, such as a portal vein of a liver, has a geometric characteristic that the predetermined structure repeatedly branches from an origin and extends in directions away from the origin in such a manner to become wider. Further, the inventor has found that it is possible to appropriately create a tree structure by reevaluating the definition of the tree structure by using a cost function that weights a probability that nodes are connected to each other by evaluating a relationship between each of the nodes and a root node based on the geometric characteristic that the predetermined structure repeatedly branches from an origin and extends in directions away from the origin in such a manner to become wider.

In the present embodiment, as illustrated in FIG. 3, a cost function is defined by further regarding the aforementioned geometric characteristic, as a characteristic that angle θ between a segment connecting root node $N_0$ and each of nodes $N_i$ and edge E between each of the nodes $N_i$ and a node $N_{i+1}$ next to each of the nodes $N_i$ in the directions away from the root node is small with respect to each of the nodes in a tree structure representing the predetermined structure.

More specifically, the angle θ is judged by calculating an inner product, as represented in the following formula (1). Weighting is performed by using the formula (1) in such a manner that a probability that each of nodes $N_i$ and node $N_{i+1}$ are connected to each other is higher as the angle θ is smaller. In this manner, the geometric characteristic is reflected in creation of the tree structure.

[Formula 1]

$$f_i = \frac{\overrightarrow{N_0 N_i} \cdot \overrightarrow{N_i N_{i+1}}}{|\overrightarrow{N_0 N_i}| |\overrightarrow{N_i N_{i+1}}|} \quad (1)$$

From such an aspect, in the present embodiment, the formula (1) is defined as cost function f so that a probability that each of nodes $N_i$ and node $N_{i+1}$ are connected to each other is higher as angle θ is smaller. Further, a cost is calculated for each of N nodes (N is the number of nodes) by using the cost function f. In the present embodiment, the position of an origin is selected by a manual operation at an input device, such as a mouse, and the position of the origin is input as root node $N_0$, which corresponds to the origin of the portal vein.

Further, the tree structure creation means 13 reconnects the nodes based on each of the calculated costs, and creates a tree structure in such a manner to obtain maxΣf by using a minimum spanning tree algorithm. Various kinds of known method for creating a tree structure based on a cost function that evaluate the cost of each node may be used. For example, tree structure M may be created by determining an optimal path in such a manner to obtain maxΣf by using a known spanning tree creation algorithm, such as a minimum spanning tree algorithm or a shortest path tree algorithm.

Figure 4:
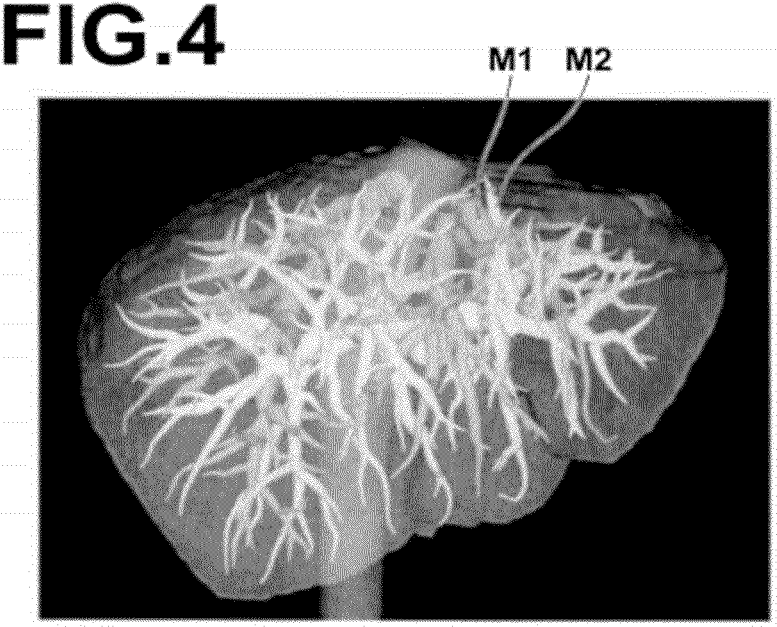
FIG. 4 is a diagram illustrating an extracted portal vein and extracted hepatic veins in a liver.

FIG. 4 is a diagram illustrating portal vein M1 extracted based on tree structure M created by the aforementioned processing, and hepatic veins M2 extracted based on a tree structure that has been separately created in a similar manner. As illustrated in FIG. 4, the display control means 14 displays portal vein M1 based on tree structure M created by the tree structure creation means 13. The portal vein M1 is displayed on the display 3 by using a known method. In the present embodiment, tree structure creation processing similar to the processing performed on the portal vein is performed also on the hepatic veins, and hepatic veins M2 are displayed on the display 3.

According to the first embodiment, even if a structure branches many times, as in a portal vein and hepatic veins of a liver, and branches of blood vessels of the structure run close to each other in such a manner that they are entangled or intermingled with each other, it is possible to efficiently and accurately create a tree structure of the structure, because the tree structure is created by reevaluating the definition of the tree structure by utilizing a geometric characteristic that the predetermined structure repeatedly branches from an origin and extends in directions away from the origin in such a manner to become wider.

Further, it is possible to easily create a tree structure in a desirable manner by weighting a probability that nodes are connected to each other, based on the geometric characteristic that the predetermined structure repeatedly branches from an origin and extends in directions away from the origin in such a manner to become wider, by defining the geometric characteristic by using an inner product of a segment connecting a root node and each of the nodes and an edge between the node connected to the root node and a node next to the node in the directions away from the root node (the directions in which the structure repeatedly branches from the root node and extends away from the root node).

Further, in a modified example of this embodiment, any kind of evaluation method may be used instead of the formula (1) as long as the evaluation method evaluates based on a characteristic that a relative angle between a segment connecting candidate points to be connected to each other and a segment connecting the candidate point and a root node is small in a tree structure representing a predetermined structure.

The present invention is not limited to the present embodiment. The cost function in the tree structure creation apparatus of the present invention may be any function as long as a probability that nodes are connected to each other is weighted by evaluating a relationship between each node and a root node based on a geometric characteristic that a predetermined structure repeatedly branching from an origin and extending in directions away from the origin in such a manner to become wider. For example, the cost function may weight the probability that each of nodes and a node next to each of the nodes are connected to each other by using the cost function represented in formula (2). In the formula (2), weighting is performed in such a manner that the probability that each of the nodes and a node next to each of the nodes are connected to each other is higher as a difference between the length of a segment connecting a root node and each of the nodes and the length of an edge between the node connected to the root node and a node next to the node in the directions away from the root node (the directions in which the structure repeatedly branches from the root node and extends away from the root node) is smaller.

[Formula 2]

$$f_i = \frac{|\overrightarrow{N_0 N_{i+1}}| - |\overrightarrow{N_i N_{i+1}}|}{|\overrightarrow{N_0 N_i}|} \quad (2)$$

When weighting is performed in such a manner that the probability that each of the nodes and a node next to each of the nodes are connected to each other is higher as a difference between the length of a segment connecting a root node and each of the nodes and the length of an edge between the node connected to the root node and a node next to the node in the directions away from the root node (the directions in which the structure repeatedly branches from the root node and extends away from the root node) is smaller, it is possible to easily create a tree structure in a desirable manner by weighting the probability that nodes are connected to each other based on the aforementioned characteristic.

Further, the present invention is not limited to the aforementioned embodiments. Cost function f may be further weighted in such a manner that the strength of connection is higher as a distance between nodes is shorter. Further, an arbitrary known weighting method may be used in combination.

Figure 5:
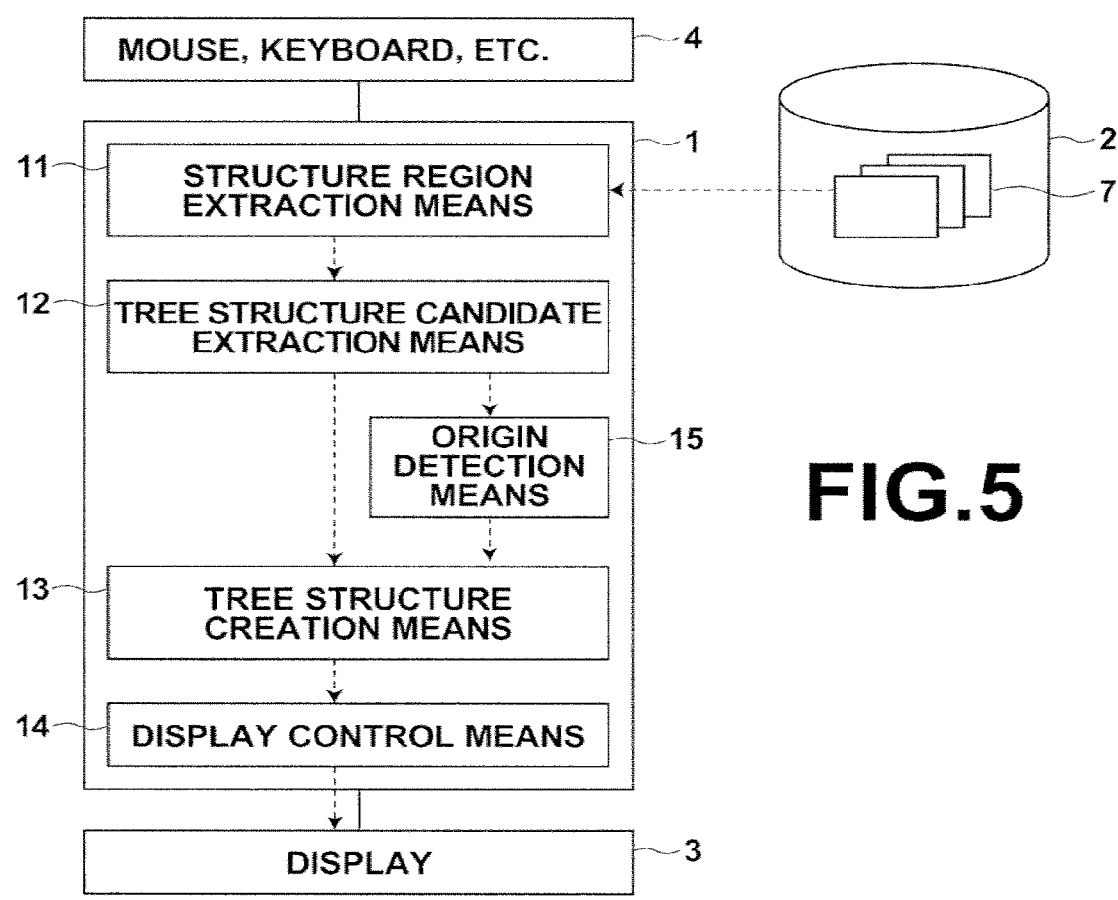
FIG. 5 is a functional block diagram illustrating a tree structure creation apparatus according to a second embodiment of the present invention.

FIG. 5 illustrates a second embodiment of the present invention. As illustrated in FIG. 5, the tree structure creation apparatus 1 further includes an origin detection means 15. The origin detection means 15 detects an origin by performing machine learning on plural sets of training data, each representing a portal vein in which an origin is known. The tree structure creation processing may be performed by obtaining the origin detected by the origin detection means 15, and by identifying a root node corresponding to the obtained origin by a known method. In the second embodiment, Adaboost algorithm is used, and an origin is detected based on the feature value of an origin that is known in training data, and the coordinate value of the origin is obtained in the coordinate system of image data. Further, a root node is identified based on the coordinate value of the origin. In such a case, it is possible to omit a manual operation for inputting the origin. Therefore, it is possible to create a tree structure more efficiently. Further, when the origin is detected by Adaboost algorithm, it is possible to detect the origin in the predetermined structure in a desirable manner. Further, the present invention is not limited to the second embodiment. Various kinds of known method for extracting an origin may be applied to the present invention.

In the descriptions of this specification, a portal vein is used as a predetermined structure. However, the predetermined structure may be any structure as long as the structure is an object from which a shape model is formable, as a tree structure, by using points and edges connecting the points, and the structure has a characteristic that the predetermined structure repeatedly branches from an origin and extends in directions away from the origin in such a manner to become wider. For example, the predetermined structure may be blood vessels in a lung or a liver. Examples of the predetermined structure are a pulmonary artery and a pulmonary vein in a lung, and a portal vein, a hepatic artery and a hepatic vein in a liver.

What is claimed is:

1. A tree structure creation apparatus comprising:
    a tree structure candidate extraction unit that extracts, from medical image data, a predetermined structure repeatedly branching from an origin and extending in directions away from the origin in such a manner to become wider, as a candidate of a tree structure defined by a plurality of nodes including a root node corresponding to the origin and a plurality of edges; and
    a tree structure creation unit that creates a tree structure by reevaluating the definition of the tree structure, with respect to each of the plurality of nodes defining the extracted candidate of the tree structure, by using a cost function that weights a probability that the plurality of nodes are connected to each other by evaluating a relationship between each of the plurality of nodes and the root node based on a geometric characteristic that the predetermined structure repeatedly branches from the origin and extends in directions away from the origin in such a manner to become wider.

2. A tree structure creation apparatus, as defined in claim 1, wherein the cost function weights, based on an angle between a segment connecting the root node and each of the plurality of nodes and an edge between the node connected to the root node and a node next to the node in the directions away from the origin, in such a manner that a probability that each of the plurality of nodes and the node next to each of the plurality of nodes are connected to each other is higher as the angle is smaller.

3. A tree structure creation apparatus, as defined in claim 1, wherein the cost function weights, based on a difference between the length of a segment connecting the root node and each of the plurality of nodes and the length of an edge between the node connected to the root node and a node next to the node in the directions away from the origin, in such a manner that a probability that each of the plurality of nodes and the node next to each of the plurality of nodes are connected to each other is higher as the difference is smaller.

4. A tree structure creation apparatus, as defined in claim 1, the apparatus further comprising:
    an origin detection unit that detects the origin by performing machine learning on a plurality of sets of training data, each representing a tree structure in which an origin is known.

5. A tree structure creation apparatus, as defined in claim 1, wherein the predetermined structure is blood vessels in a lung.

6. A tree structure creation apparatus, as defined in claim 1, wherein the predetermined structure is blood vessels in a liver.

7. A tree structure creation method comprising the steps of:
    extracting, from medical image data, a predetermined structure repeatedly branching from an origin and extending in directions away from the origin in such a manner to become wider, as a candidate of a tree structure defined by a plurality of nodes including a root node corresponding to the origin and a plurality of edges; and
    creating a tree structure by reevaluating the definition of the tree structure, with respect to each of the plurality of nodes defining the extracted candidate of the tree structure, by using a cost function that weights a probability that the plurality of nodes are connected to each other by evaluating a relationship between each of the plurality of nodes and the root node based on a geometric characteristic that a predetermined structure repeatedly branches from the origin and extends in directions away from the origin in such a manner to become wider.

8. A non-transitory computer-readable recording medium stored therein a tree structure creation program causing a computer to function as:
    a tree structure candidate extraction unit that extracts, from medical image data, a predetermined structure repeatedly branching from an origin and extending in directions away from the origin in such a manner to become wider, as a candidate of a tree structure defined by a plurality of nodes including a root node corresponding to the origin and a plurality of edges; and
    a tree structure creation unit that creates a tree structure by reevaluating the definition of the tree structure, with respect to each of the plurality of nodes defining the extracted candidate of the tree structure, by using a cost function that weights a probability that the plurality of nodes are connected to each other by evaluating a relationship between each of the plurality of nodes and the root node based on a geometric characteristic that the predetermined structure repeatedly branches from the origin and extends in directions away from the origin in such a manner to become wider.

* * * * *